J. W. GIBBONS.
MEASURING DEVICE.
APPLICATION FILED MAY 16, 1917.

1,270,937.

Patented July 2, 1918.

Inventor:
James W. Gibbons
By his attorney,
Charles N. Goodwin

UNITED STATES PATENT OFFICE.

JAMES W. GIBBONS, OF BOSTON, MASSACHUSETTS.

MEASURING DEVICE.

1,270,937.         Specification of Letters Patent.         Patented July 2, 1918.

Application filed May 16, 1917. Serial No. 169,079.

*To all whom it may concern:*

Be it known that I, JAMES W. GIBBONS, a citizen of the United States, residing at Roxbury, Boston, in the county of Suffolk and State of Massachusetts, have invented new and useful Improvements in Measuring Devices, (Case A,) of which the following is a specification.

This invention relates to a measuring device which is particularly adapted to be used in restaurants known as "cafeteria" restaurants where the patrons help themselves to food and placing it on a tray then receive a cup of coffee or tea and help themselves to sugar for the coffee or tea. The tray containing the food being held in one hand, it is impossible to put the sugar in the coffee or tea without setting down the tray, and according to the present arrangement the patron is obliged to put down the tray and help himself to sugar for his coffee or tea.

It is the object of this invention to make it possible for the patron to hold the tray in one hand and with his cup of coffee in the other press against a certain portion of the measuring device of this invention and receive a certain amount of sugar which will be guided into the cup as it is held against the measuring device.

Another object of this invention is to provide a device of the character set forth in which the sugar or other material to be measured will be kept dry and this result is attained by making the walls of the hopper or container of two thicknesses with an air chamber between and also the chutes leading from the hopper have the walls thereof made of two thicknesses, with an air chamber therebetween, and the same is true of the valves by which the measuring is accomplished. This air chamber between the double walls of the hopper, the chutes and the valves prevents the condensation of moisture upon the walls of the hopper and chutes and upon the valves so that the sugar remains dry and will feed freely. Otherwise it would become moist and harden into lumps which would prevent the same from feeding freely.

The invention consists in the combination and arrangement of parts set forth in the following specification and particularly pointed out in the claims thereof.

Referring to the drawings.

Like numerals refer to like parts throughout the several views of the drawings.

Figure 1:
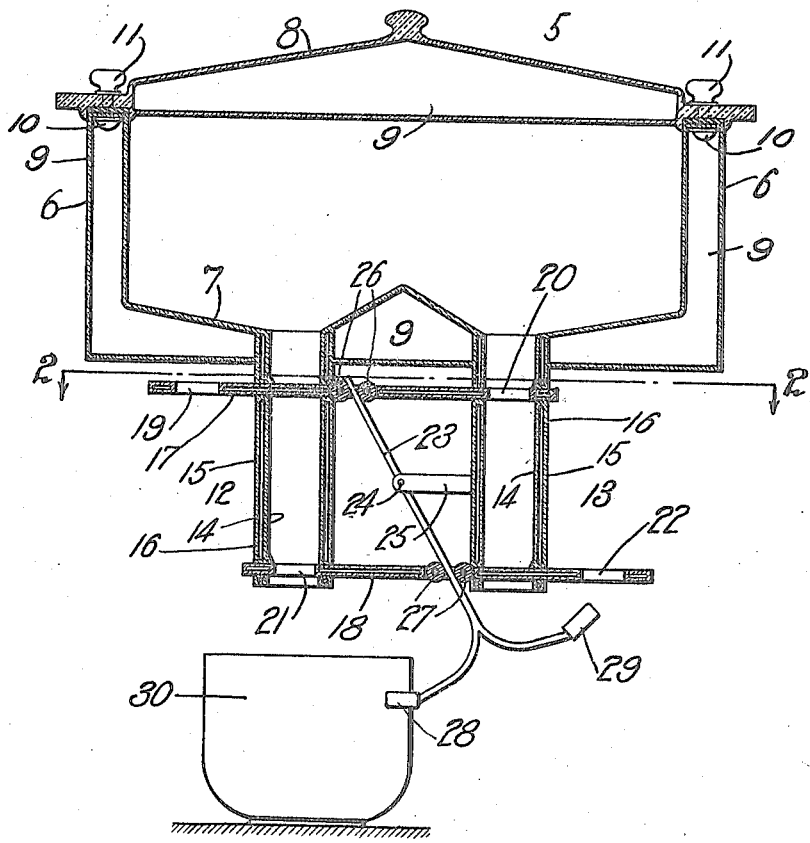
Figure 1 is a sectional elevation of my improved measuring device.
Figure 2:
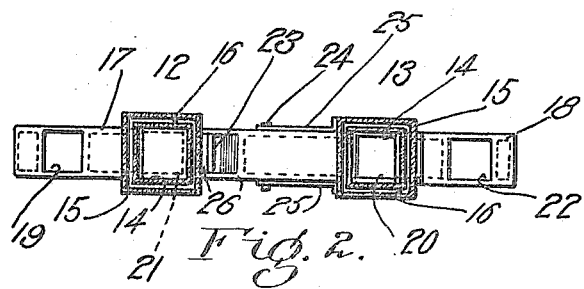
Fig. 2 is a sectional plan taken on line 2—2 of Fig. 1.

In the drawings, 5 is a hopper adapted to contain sugar or other material. 6 are the side walls of said hopper, 7 the bottom and 8 the top. It will be seen that the side walls, the bottom and the top of said hopper are made of two partitions or thicknesses and that these partitions have an air chamber 9 therebetween. The top 8 is fastened to the body portion of the hopper by means of bolts 10 and thumbscrews 11.

12 and 13 are chutes leading downwardly from the interior of the hopper 5 and said chutes are formed with an inner wall 14 and an outer wall 15, and between said inner and outer walls is an air chamber 16.

Two slide valves 17 and 18 are slidably mounted upon the chutes 12 and 13 and extend thereacross. The upper slide valve 17 is provided with two holes 19 and 20 so arranged that when the hole 20 is in alinement with the chute 13 the hole 19 is out of alinement with the chute 12 and vice versa. Said holes 19 and 20 are also so arranged that the slide 17 may be moved a part of its throw and both of said holes 19 and 20 will be out of alinement with their respective chutes 12 and 13. The lower slide valve 18 is provided with two holes 21 and 22. When the hole 21 is in alinement with the chute 12, then the hole 22 is out of alinement with the chute 13 and vice versa. The holes 21 and 22 are so arranged relatively to the chutes that when the slide 18 has been moved a portion of its throw both of said holes will be out of alinement with their respective chutes 12 and 13.

The slides 17 and 18 are moved alternately in opposite directions by means of a lever 23 which is pivoted at 24 to a bracket 25 fast to the chute 13. One end of the lever 23 projects between rolls 26 on the slide 17; the other end of said lever projects between rolls 27 on the slide 18. The lower end of the lever 23 is provided with two plates 28 and 29.

The operation of the device is as follows: Assuming the parts to be in the relative positions shown in Fig. 1, it will be seen that the cup 30 is then in position to receive sugar from the chute 12, the hole 21 being in alinement with the chute 12 and the hole 19 out of alinement therewith. On the other hand the chute 13 is at this time being filled with sugar from the hopper 5 which enters through the hole 20 in the slide 17 and fills up the space between said slide and the lower slide 18.

When it is desired to obtain another supply of sugar, the user presses the cup 30 against the plate 29 and tips the lever 23 upon its pivot, thereby moving the slide 17 toward the right and the slide 18 toward the left, thus bringing the hole 19 in alinement with the chute 12 and the hole 22 in alinement with the chute 13. The sugar will then be delivered to the cup from the chute 13, while the chute 12 will be filled with sugar through the hole 19.

Having thus described my invention, what I claim and desire by Letters Patent to secure is:

1. A measuring device having, in combination, a pair of chutes, two valves slidably mounted in and extending across both of said chutes, one above the other, each of said valves having two holes therethrough, and means adapted to simultaneously move said slide valves in opposite directions, all of the holes in said valves being adapted to be moved out of alinement with said chutes at the same time.

2. A measuring device having, in combination, a pair of chutes, two valves slidably mounted in and extending across both of said chutes, one above the other, each of said valves having two holes therethrough, and means adapted to simultaneously move said slide valves in opposite directions, one of the holes in both of said slide valves being adapted to be brought alternately in alinement with each of said chutes.

3. A measuring device having, in combination, a pair of chutes, two valves slidably mounted in and extending across both of said chutes, one above the other, each of said valves having two holes therethrough, and means adapted to simultaneously move said slide valves in opposite directions, the holes in said slide valves being so arranged that the hole in one of said slides is in alinement with one of said chutes, while the hole in another of said slides is out of alinement with said chute.

4. A measuring device having, in combination, a pair of chutes, two valves slidably mounted in and extending across both of said chutes, one above the other, each of said valves having two holes therethrough, and means adapted to simultaneously move said slide valves in opposite directions, the holes in said slide valves so arranged that a hole in one of said slides is in alinement with one of said chutes, while the other hole in said slide is out of alinement with the other of said chutes.

5. A measuring device having, in combination, a pair of chutes, two valves slidably mounted in and extending across both of said chutes, one above the other, each of said valves having two holes therethrough, and means adapted to simultaneously move said slide valves in opposite directions, the holes in said slide valves being so arranged that a hole in each of said slides is in alinement with one of said chutes, while the other hole in each of said slides is out of alinement with the other of said chutes, no two of said holes being in alinement with the same chute simultaneously.

6. A measuring device having, in combination, a pair of chutes, two valves slidably mounted in and extending across both of said chutes, one above the other, each of said valves having two holes therethrough, and a lever pivoted to said chutes and connected on opposite sides of its pivot to said slide valves, the holes in said valves being so arranged that they may alternately be brought into and out of alinement with said chutes, but so arranged that no two of the holes in said slide valves may be in alinement with the same chute simultaneously.

In testimony whereof I have hereunto set my hand in presence of two subscribing witnesses.

JAMES W. GIBBONS.

Witnesses:
SYDNEY E. TAFT,
HATTIE E. STRATTON.